(12) United States Patent
Liu et al.

(10) Patent No.: US 8,908,592 B2
(45) Date of Patent: Dec. 9, 2014

(54) SYSTEM AND METHOD FOR UPLINK POWER CONTROL

(75) Inventors: Chunmei Liu, Great Falls, VA (US);
Dhaval Dipak Mehta, Reston, VA (US);
Sungki Park, Ashburn, VA (US);
Masoud Olfat, Great Falls, VA (US);
Durga Prasad Satapathy, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 785 days.

(21) Appl. No.: 13/016,633

(22) Filed: Jan. 28, 2011

(65) Prior Publication Data

US 2012/0195241 A1    Aug. 2, 2012

(51) Int. Cl.
*H04B 7/185* (2006.01)
*H04W 52/50* (2009.01)
*H04W 52/36* (2009.01)
*H04W 52/14* (2009.01)

(52) U.S. Cl.
CPC .............. *H04W 52/50* (2013.01); *H04W 52/36* (2013.01); *H04W 52/146* (2013.01)
USPC ........................................................ 370/318

(58) Field of Classification Search
USPC ........................................................ 370/318
See application file for complete search history.

(56) References Cited

U.S. PATENT DOCUMENTS

2008/0207122 A1*  8/2008  Ahn et al. ...................... 455/39
2010/0234061 A1*  9/2010  Khandekar et al. ........... 455/522
2011/0038345 A1*  2/2011  Liu et al. ...................... 370/330

\* cited by examiner

*Primary Examiner* — Shaq Taha

(57) ABSTRACT

In various embodiments, a system and method for providing uplink (UL) power control for a wireless mobile station (MS) includes, after transmission of an unanswered bandwidth request by the MS, incrementally boosting an UL transmit power of one or more subsequent bandwidth requests by the MS to a boosted UL power level at which UL bandwidth is allocated to the MS by the BS; selectively reporting the boosted UL power level to the BS immediately after the UL transmit power has been boosted; and selectively controlling the boosted UL power level by the BS responsive to the boosted UL power level reported to the BS. A MS is configured to carry out the UL power control method and a BS is configured to generate MS UL power control commands based, at least in part, upon the UL power level reported to the BS.

21 Claims, 12 Drawing Sheets

POWER BOOSTING – WITH OPTIONAL BS POWER CONTROL

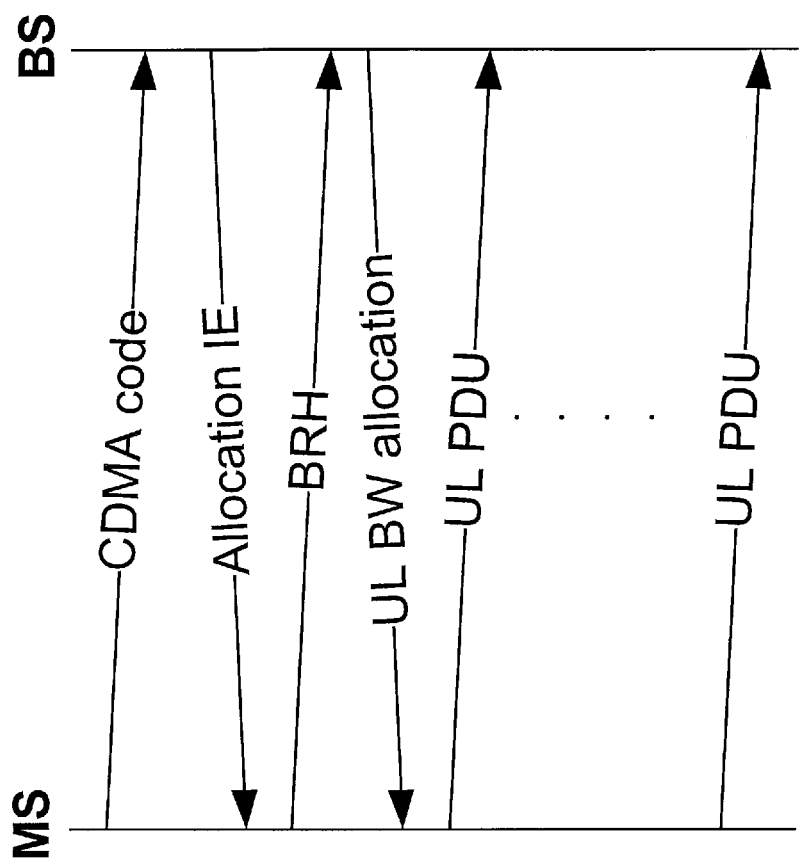
FIG. 1 (BACKGROUND)

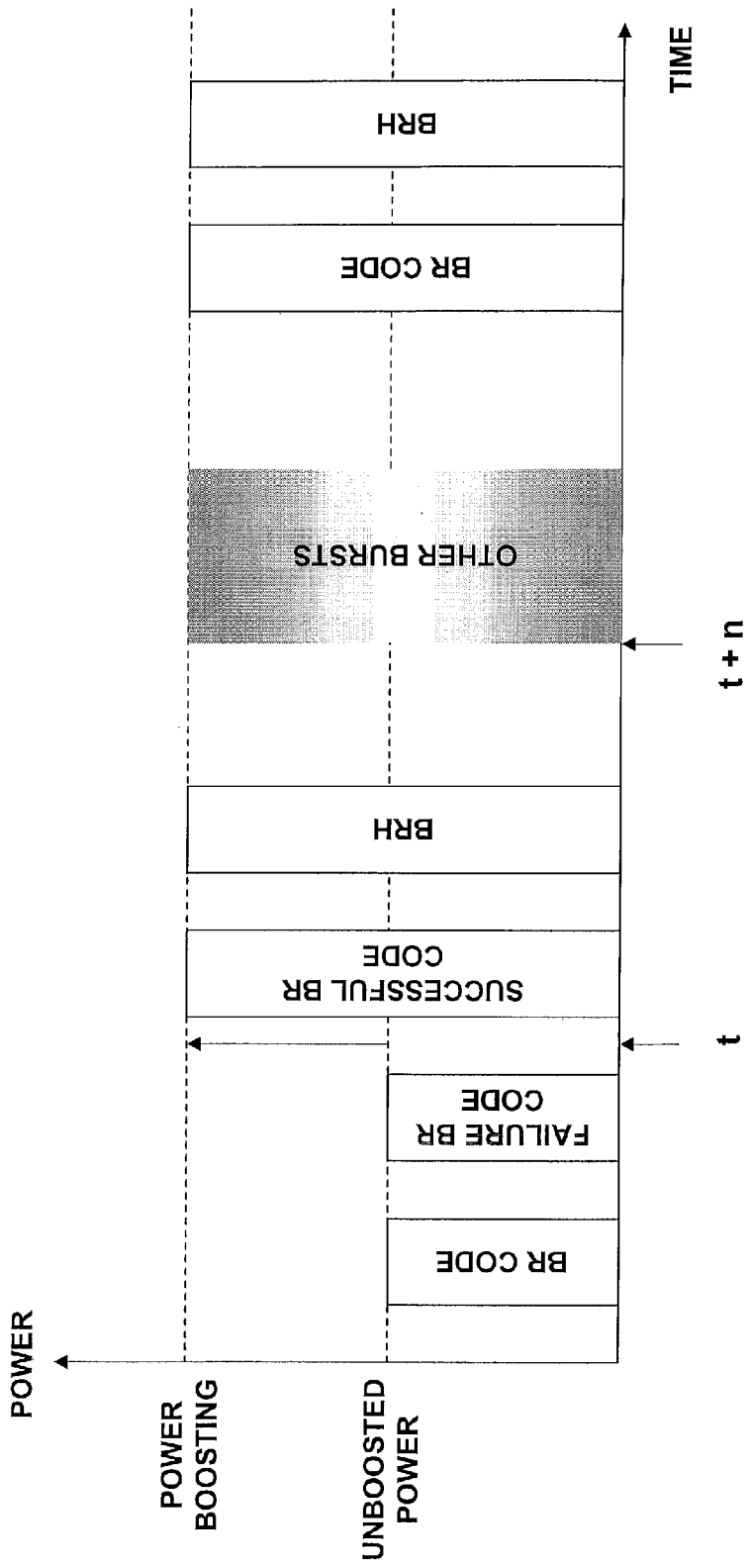
FIG. 2A (BACKGROUND)

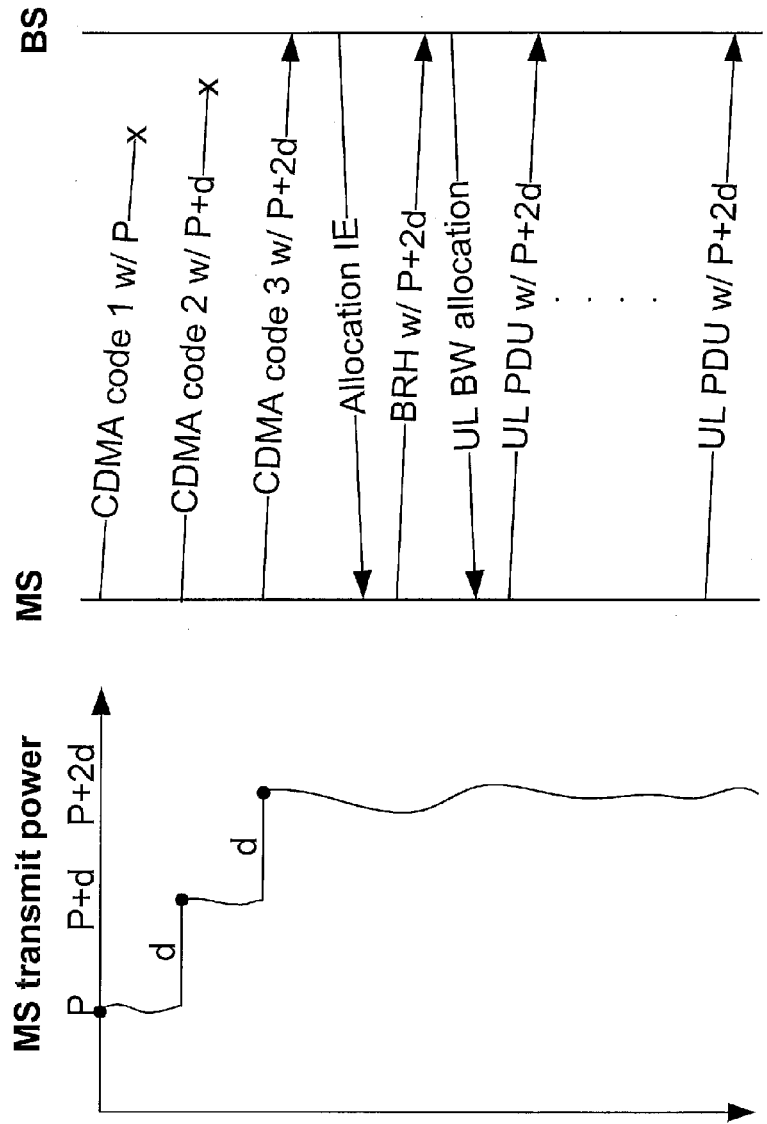
FIG. 2B (BACKGROUND)
LOST CDMA CODES/PACKET COLLISION – UNNECESSARY POWER BOOSTING

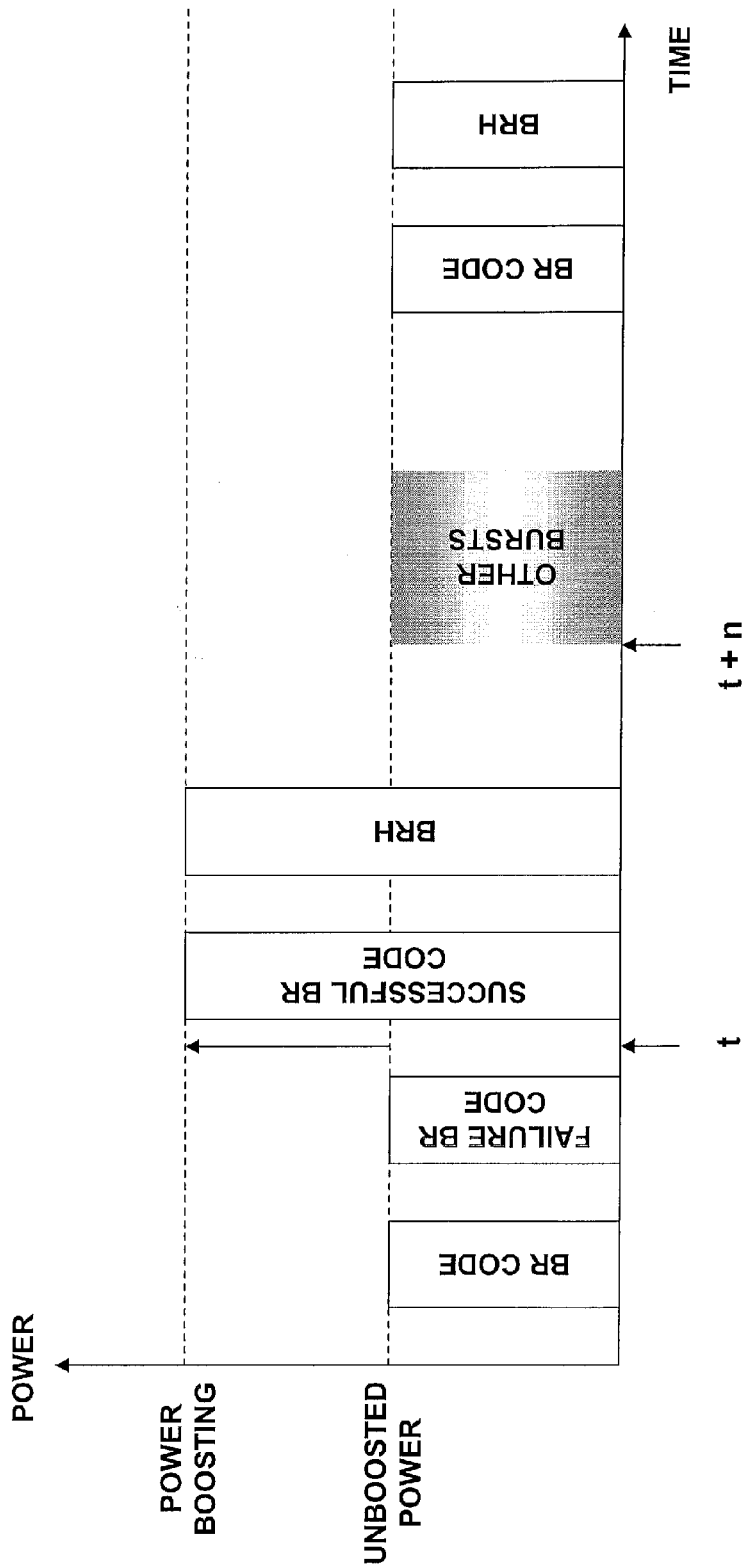
FIG. 3A (BACKGROUND)

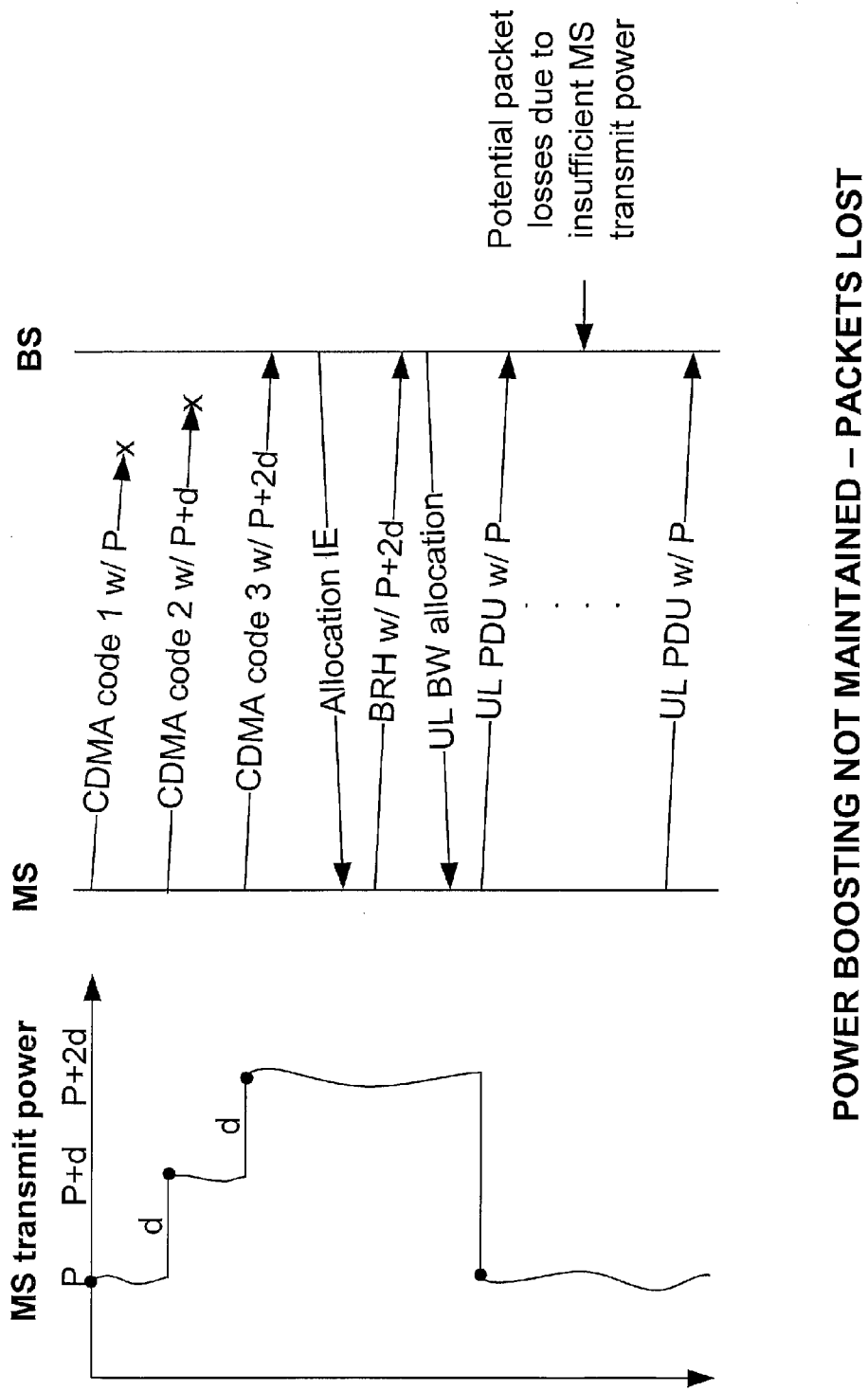
FIG. 3B (BACKGROUND)
POWER BOOSTING NOT MAINTAINED – PACKETS LOST

POWER BOOSTING – WITH OPTIONAL BS POWER CONTROL

POWER BOOSTING – WITHOUT BS POWER CONTROL

SYSTEM AND METHOD FOR UPLINK POWER CONTROL

BACKGROUND

This disclosure is generally related to wireless communications technologies, including fourth generation ("4G") Worldwide Interoperability for Microwave Access ("WiMAX") and/or Long-Term Evolution (LTE) technologies. In one or more embodiments, this disclosure is directed to a system and method for controlling uplink (UL) power of a mobile station (MS) in a Radio Access Network (RAN), such as a WiMAX RAN, or user equipment (UE) in an LTE network. In one or more embodiments, this disclosure is useful for allowing a base station (BS) of a WiMAX RAN or an eNodeB (eNB) of an LTE RAN to perform MS or UE UL power control so that unnecessary packet losses and high UL signal level and interference can be avoided, and so battery power in the MS or UE can be conserved.

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their third generation or "3G" counterpart devices. WiMAX and LTE devices and networks are examples of "4G" technologies.

Quality of Service is determined by various factors, including variable signal conditions on the wireless link; throughput, latency/delay and transmission errors which vary much more widely over a wireless connection because of the constantly changing radio signal conditions and extensive digital radio processing. Standard internet protocols, designed for use over a more stable wire-based connection, are not well-suited to handle these variations.

Admission control is performed by the BS during network entry and re-entry for statically-provisioned service flows (SF), e.g. initial service flows, and is also performed by the BS in response to dynamic BS-initiated or MS-initiated requests to create service flows. Further, Admission control is performed by the BS during handovers. Admission control can be used to limit the amount of total air interface resources that are consumed by real-time service flows. Since real-time service flows are allocated resources before non-real-time and best effort service flows, this feature prevents real-time traffic from "starving" best effort traffic.

A fundamental feature of WiMAX involves the classification of traffic into separate service flows. Different QoS attributes can be defined for each SF based on the type of traffic. To support multimedia applications, the WiMAX standard defines five types of data delivery service flows for downlink (DL) flows, and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP; nrtPS—Non-real Time Polling Service, time insensitive, but require a minimum bandwidth allocation; and BE—Best Effort. Uplink is differentiated from downlink because uplink flows (except UGS) involve some form of request/grant mechanism for resource allocations. The order of priority given to services while transmitting is generally as follows: UGS>ertPS>rtPS>nrtPS>BE. However, the particular scheduling mechanism is generally left to proprietary implementations.

In the UL direction, all SF types except UGS involve some form of bandwidth request/grant mechanism for bandwidth allocation. In the DL, the BS scheduler has all the information about DL SF status for making the best scheduling decision. However, UL SF status information is distributed in the MSs. Additionally, an MS may need to be assigned some small bandwidth to send UL SF status information to the BS. Therefore, some mechanisms (e.g., "Bandwidth Request Header" [BRH] or "Bandwidth Request and UL Tx Power Report Header" [BRTH]) are required to inform the BS scheduler of UL SF status (i.e., BRH or BRTH messages). Basically, BR refers to a mechanism MSs use to indicate to the BS their bandwidth needs, and BRTH refers to a similar mechanism in which MSs indicate not only their bandwidth needs to the BS, but which also provide an indication of UL transmit (Tx) power.

LTE is the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. Most major mobile carriers in the United States and several worldwide carriers announced plans to convert their networks to LTE beginning in 2009. LTE is a set of enhancements to the Universal Mobile Telecommunications System (UMTS) which is introduced in 3rd Generation Partnership Project (3GPP) Release 8, with further enhancements in Release 9. These enhancements focus on adopting 4G mobile communications technology, including an all-IP flat networking architecture.

The QoS levels provided in the LTE evolved packet system (EPS) relies upon the concept of a "bearer", which is a packet flow established between the packet data network gateway (PDN-GW) and the user equipment, UE. The traffic running between a particular client application and a service can be differentiated into separate service data flows (SDFs). SDFs mapped to the same bearer receive a common QoS treatment (e.g., scheduling policy, queue management policy, rate shaping policy, radio link control (RLC) configuration). A bearer is assigned a scalar value referred to as a QoS class identifier (QCI), which specifies the class to which the bearer belongs. QCI refers to a set of packet forwarding treatments (e.g., scheduling weights, admission thresholds, queue management thresholds, and link layer protocol configuration) pre-configured by the operator for each network element. The class-based method improves the scalability of the LTE QoS framework. Bearer management and control in LTE follows the network-initiated QoS control paradigm, and the network initiated establishment, modification, and deletion of the bearers.

Similar to WiMAX service flows, LTE offers two types of bearers, i.e., (1) Guaranteed bit rate (GBR), in which dedicated network resources related to a GBR value associated with the bearer are permanently allocated when a bearer becomes established or modified; and (2) Non-guaranteed bit rate (non-GBR), in which a non-GBR bearer may experience congestion-related packet loss. A non-GBR bearer is referred to as the default bearer, which is also used to establish IP connectivity, similar to the initial SF in WiMAX. Any additional bearer(s) is referred to as a dedicated bearer, and can be GBR or non-GBR. Maximum bit rate (MBR) is the maximum sustained traffic rate the bearer may not exceed, and is only valid for GBR bearers. The GBR represents the minimum reserved traffic rate the network guarantees, and is only valid for GBR bearers.

As may be seen from the above, WiMAX and LTE have many similar features. For example, WiMAX utilizes CQI, throughput, CINR, and MIMO that are all present in LTE. QoS is also similar between WiMAX and LTE. LTE employs dedicated bearers similar to service flows in WiMAX. Admission control is applied for GBR bearers in LTE similar to WiMAX. LTE bearers can be configured for semi-persistent scheduling similar to unsolicited grants for UGS and ertps service flows in WiMAX. Both LTE and WiMAX provide mechanisms to suspend and resume semi-persistent/unsolicited grant resource allocations.

In WiMAX, a BS uses radio-frequency (RF) signals to connect MSs, and the BS is in charge of network functionality. Data transmitted by MSs will go through the BS and the operator backbone network before reaching the Internet. When a MS wants to transmit data, one channel access method in the IEEE 802.16 standard uses a code division multiple access (CDMA) method. The CDMA ranging method selects between many different CDMA ranging codes in a CDMA code group. Upon a successful CDMA code reception, the MS is granted bandwidth to send a request for bandwidth (BRH or BRTH) to the BS for reserving future bandwidth.

The IEEE 802.16 standard defines four CDMA code groups for the use of the CDMA ranging method, i.e., Initial Ranging, Periodic Ranging, Handover Ranging (HO), and BR. When the MS wants to send a BR, it randomly chooses a ranging code in the BR ranging code group and then sends the ranging code to the BS. Once the BS receives the ranging code from the MS, it reserves bandwidth in later frames for the MS. This CDMA method can have the benefit of avoiding a collision under the assumption that different MSs choose different ranging codes when they simultaneously send BRs to the BS. Under some circumstances, this CDMA ranging method can greatly improve the BR transmission success rate, but it is possible for identical CDMA ranging codes to be selected by different MSs and to be sent in the same ranging slots.

FIG. 1 illustrates a conventional call flow or message procedure for contention based bandwidth request (BR) under the existing WiMAX standard in which the MS sends a CDMA ranging code (CDMA code) to the BS. In response to this "best case" scenario, the BS sends an allocation information element (IE) to the MS, which then requests bandwidth by means of the BRH message. The BS assigns an UL bandwidth (BW) allocation to the MS. After BW is allocated, the MS may then transmit data to the BS via UL protocol data units (PDU).

However, the current WiMAX standard often leads to unnecessarily high UL signal power and interference, and short mobile device battery life. In the current WiMAX standard, the BS will not respond to the MS if it cannot decode the CDMA ranging code, either due to insufficient UL power, or a packet collision by two MSs transmitting the same CDMA ranging code in the same ranging slots. Further, the MS will increase its power and sends another BR CDMA code when it does not receive any response from the BS for the previous CDMA code, The current WiMAX standard does not include triggers for the MS to adjust its transmit power after this CDMA ranging procedure for the following data transmissions to allow the MS to operate at an appropriate power level to conserve precious mobile device battery power. In a typical case, when the failure of ranging codes is due to collisions, the conventional approach leads to unnecessarily high MS transmit power and high UL signal level and interference between BR ranging codes and the next power adjustment.

FIG. 2A illustrates a conventional packet collision scenario (from the MS perspective) that is possible under the existing WiMAX standard and in which sustained power boosting is used, but is unnecessary. FIG. 2B illustrates the associated call flow or message procedure between MS and BS related to FIG. 2A. Lost CDMA ranging codes occur before time t, and power boosting is applied at time t but is not necessary. FIG. 2B shows three CDMA codes being sent, where the first two were unable to be decoded by the BS. Once the third CDMA code is received and decoded, the BS sends an allocation IE to the MS, a BRH message is sent at the successful power level (i.e., P+2d), and an UL BW allocation is sent to grant bandwidth to the MS by the BS. Normal UL PDU communication then occurs at the P+2d power level. WiMAX typically uses power increments of 3 dB for each CDMA code re-transmission.

FIGS. 2A and 2B illustrate the wasting or the unnecessary boosting of MS power, at least after the initial CDMA ranging is resolved. Extended power boosting in this scenario can lead to high interference, an unnecessarily high UL signal power level, and short MS device battery life.

FIG. 3A illustrates a different conventional power shortage scenario (from the MS perspective) in which sustained power boosting is not maintained, and in which packets may be lost. FIG. 3B illustrates a previously proposed WiMAX standard change that provides a call or message flow procedure between MS and BS related to the power shortage scenario of FIG. 3A. This prior art solution to the problem with the existing WiMAX standard attempts to apply a UL power increase only until the first UL allocation after the CDMA ranging procedure. Thereafter, packet losses may occur before the next UL power adjustment. In FIG. 3A, power boosting is applied at time t after the MS CDMA ranging code has been unsuccessfully received and/or decoded by the BS. However, in this prior art implementation, rather than maintain the boosted UL power, at time (t+n) the UL power is reduced after receiving a BW allocation. The call flow diagram of FIG. 3B shows that UL power is initially boosted until the first UL allocation assigned by the allocation IE to the MS by the BS, resulting in potential for UL PDU packet losses due to insufficient MS UL transmit power.

The WiMAX OFDMA system applies CDMA ranging for initial ranging, periodic ranging, handover (HO) ranging, and bandwidth request (BR) ranging. When a MS sends a CDMA code but fails to receive a response, there are two possible causes, as the above scenarios illustrate:

(1) A collision scenario results when multiple MSs using the same CDMA ranging code in the same ranging slots may result in boosted MS power being maintained on other bursts as well as future BR code and BRH until a new power correction occurs. However, boosted power may not be needed as the power boosting results from collisions of CDMA codes from different MSs, and not by a power shortage. Too much power boosting leads to high interference, unnecessarily high UL signal power level, and short mobile device battery life.

(2) A power shortage scenario may occur when boosted MS power is not applied on other bursts. However, these bursts may need boosted power if a previous BR code failure is due to insufficient transmit power. In this case, it is necessary for the MS to increase its transmission power. However, typically the MS is unable to tell if the failure is due to packet collision or insufficient MS transmission power.

The current WiMAX standard essentially only solves the problem of insufficient MS transmission power (see FIGS.

2A and 2B). Specifically, the current standard supports an passive open loop MS power control mode, where the power per a subcarrier is specified as being required to be maintained for the UL transmission as in equation (1), below:

$$P(dBm)=L+C/N+NI-10\log 10(R)+\text{Offset\_SS}_{perSS}+\text{Offset\_BS}_{perSS} \quad (1)$$

where IEEE 802.16-2009 defines these terms as follows:
P is the Tx power level (dBm) per a subcarrier for the current transmission, including MS Tx antenna gain;
L is the estimated average current UL propagation loss, and shall include MS Tx gain and path loss, but exclude the BS Rx antenna gain;
C/N is the normalized carrier-to-noise ratio of the modulation/forward error correction (FEC) rate for the current transmission;
R is the number of repetitions for the modulation/FEC rate;
NI is the estimated average power level (dBm) of the noise and interference per a subcarrier at BS, not including BS Rx antenna gain;
$\text{Offset\_SS}_{perSS}$ is the correction term for SS-specific power offset, and is controlled by the MS, with an initial value of zero;
$\text{Offset\_BS}_{perSS}$ is the correction term for SS-specific power offset, and is controlled by the BS with power control messages.

As in FIGS. 2A and 2B, when a MS sends CDMA codes for BR, if the MS does not receive a response, the MS sends a new CDMA code at the next appropriate opportunity at one step higher power level, e.g., increasing in +3 dB increments, up to a predefined maximum power value. In addition, the power increase during the CDMA code re-transmission procedure is reflected into the term "$\text{Offset\_BS}_{perSS}$" in the above power control formula. That is, the power increase is applied to all future UL transmissions.

While it may be appropriate to apply such open loop power increases to future UL allocations when the failure in receiving a response is due to insufficient UL transmission power, this could cause problems when the failure is due to collisions, such as an unnecessarily high UL signal power level. In addition, this also leads to high interference level and short MS battery life.

In recognition of the above issues, the proposed WiMAX solution illustrated in FIGS. 3A and 3B considers the case of packet collision and proposes that the MS shall not increase "$\text{Offset\_BS}_{perSS}$" or "$\text{Offset\_MS}_{perSS}$" based on CDMA ranging success or failure. Further, when the MS performs a BW Request CDMA ranging retry or Periodic CDMA ranging retry and increases MS transmit power, the MS shall apply the same increase in transmit power to future CDMA ranging attempts until a response is received from the BS, e.g., either a RNG-RSP or CDMA allocation IE. After a response is received, future CDMA ranging attempts shall not use this transmit power increase. Finally, when the MS performs a BW Request CDMA ranging "retry" and increases MS transmit power, the MS shall apply the same increase in transmit power to the UL allocation provided by the CDMA allocation IE. The transmitted power of other bursts will not be affected from this amount of power adjustment.

FIG. 3A illustrates proposed power shortage solution scenario (from the MS perspective) possible under the existing WiMAX standard in which sustained power boosting is not maintained, and in which packets may be lost. FIG. 3B illustrates a previously proposed change to the WiMAX standard that provides a call or message flow procedure between MS and BS related to the power shortage scenario of FIG. 3A. This proposed, but not yet implemented "solution" to the problem with the existing WiMAX standard attempts to apply a UL power increase only until the first UL allocation IE is received. Thereafter, packet losses may occur before the next UL power allocation. In FIG. 3A, power boosting is applied at time t, after the MS CDMA ranging code has been unsuccessfully received and/or decoded by the BS. However, in this proposed implementation, rather than maintain the boosted UL power, at time (t+n) the UL power is reduced after receiving a BW allocation. The call flow diagram of FIG. 3B shows that UL power is initially boosted only until an allocation IE is sent to the MS by the BS, resulting in potential for UL PDU packet losses due to insufficient MS UL transmit power for subsequent packets.

Essentially, this proposed, but not yet implemented approach removes the power increases during the ranging procedure from future UL transmissions, except for the UL allocation provided by the CDMA allocation IE immediately after a BR ranging.

While this proposed approach does solve the issues of the current WiMAX standard as indicated above, in the case when the power increase is due to insufficient transmission power, which is a typical case, this approach makes the MS operate at insufficient power levels until the next power control adjustment cycle, and hence often leads to packet losses between the removal time of the power increases and the next power control adjustment from the BS.

LTE encounters similar problems in establishing the required bandwidth for a number of mobile users who may either be "colliding" with each other, or who may have insufficient UL transmit power.

Further, and although the current WiMAX standard does allow the BS to control the MS UL power in a closed loop manner, the existing algorithm used does not account for MS UL power as an input to the closed loop power control algorithm.

What is needed is a system and method of wireless communications that improves connectivity for mobile users, and which accounts for different mechanisms that may inefficiently boost MS UL power. What is further needed is a system and method for wireless communications that provides improved UL power management, including the ability to selectively allow the BS to provide MS UL power control to improve QoS and conserve MS battery power.

SUMMARY

The method and system of this disclosure provide various features, functions, and capabilities as discussed more fully in the detailed description.

Appropriate MS transmission power adjustment is desirable for wireless network operations from various perspectives, such as successful data transmission, interference mitigation, battery life, etc. Various embodiments consider MS transmission power adjustment during and after CDMA ranging code transmissions, including bandwidth request (BR) ranging code transmission.

In one embodiment, a method for providing uplink (UL) power control for a wireless mobile station (MS) includes, after transmission of an unanswered bandwidth request by the MS, incrementally boosting an UL transmit power of one or more subsequent bandwidth requests by the MS to a boosted UL power level at which UL bandwidth is allocated to the MS by the BS; selectively reporting the boosted UL power level to the BS immediately after the UL transmit power has been boosted; and selectively controlling the boosted UL power level by the BS responsive to the boosted UL power level reported to the BS.

In another embodiment, a system for providing mobile station (MS) uplink (UL) power control for a wireless MS includes an MS comprising at least one processor and a transceiver; wherein the MS is configured to: after transmission of an unanswered bandwidth request by the MS, incrementally boost an UL transmit power of one or more subsequent bandwidth requests by the MS to a boosted power level at which UL bandwidth is allocated to the MS by the BS; selectively report the boosted UL power level to the BS immediately after the UL transmit power has been boosted; receive an MS UL power control command from a Base Station (BS) that determines an UL power correction in response to the report of the boosted UL power level to the BS; and in response to the MS UL power control command, apply the UL power correction to the MS UL.

In another embodiment, a base station (BS) capable of communication in a radio access network (RAN) with a mobile station (MS) includes a transceiver; one or more processors operatively coupled to the transceiver; and a MS bandwidth allocation module, wherein the MS bandwidth allocation module is configured to process a received MS uplink (UL) transmit power report and, in response thereto, to generate one or more MS UL power control commands.

These and other aspects of the present disclosure, as well as the methods of operation and functions of the related elements of structure and the combination of parts and economies of manufacture will become more apparent upon consideration of the following description and the appended claims with reference to the accompanying drawings, all of which form a part of this specification, wherein like reference numerals designate corresponding parts in the various figures. As used in the specification and in the claims, the singular form of "a", "an", and "the" include plural referents unless the context clearly dictates otherwise.

BRIEF DISCUSSION OF THE DRAWINGS

FIG. 1 illustrates a conventional call flow or message procedure for contention based bandwidth request (BR) under the existing WiMAX standard;

FIG. 2A illustrates a conventional packet collision scenario (from the MS perspective) that is possible under the existing WiMAX standard and in which sustained power boosting is unnecessary;

FIG. 2B illustrates a conventional call flow or message procedure between MS and BS related to FIG. 2A where lost CDMA ranging codes occur and in which power boosting is applied under the existing WiMAX standard;

FIG. 3A illustrates a conventional power shortage scenario possible under a draft proposal submitted to the WiMAX Forum in which sustained power boosting is not maintained, and in which packets may be lost;

Figure 4A:
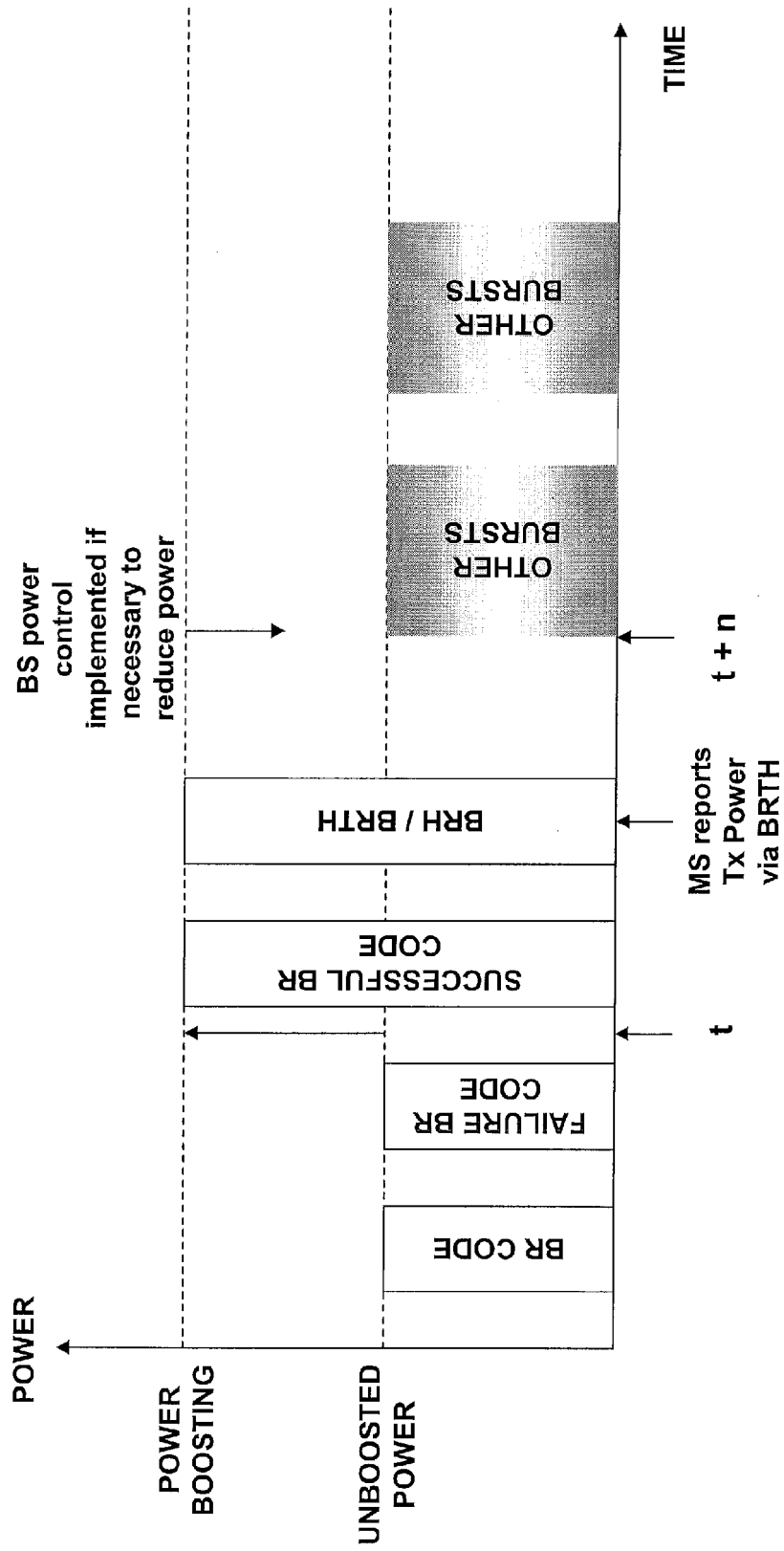
Figure 4B:
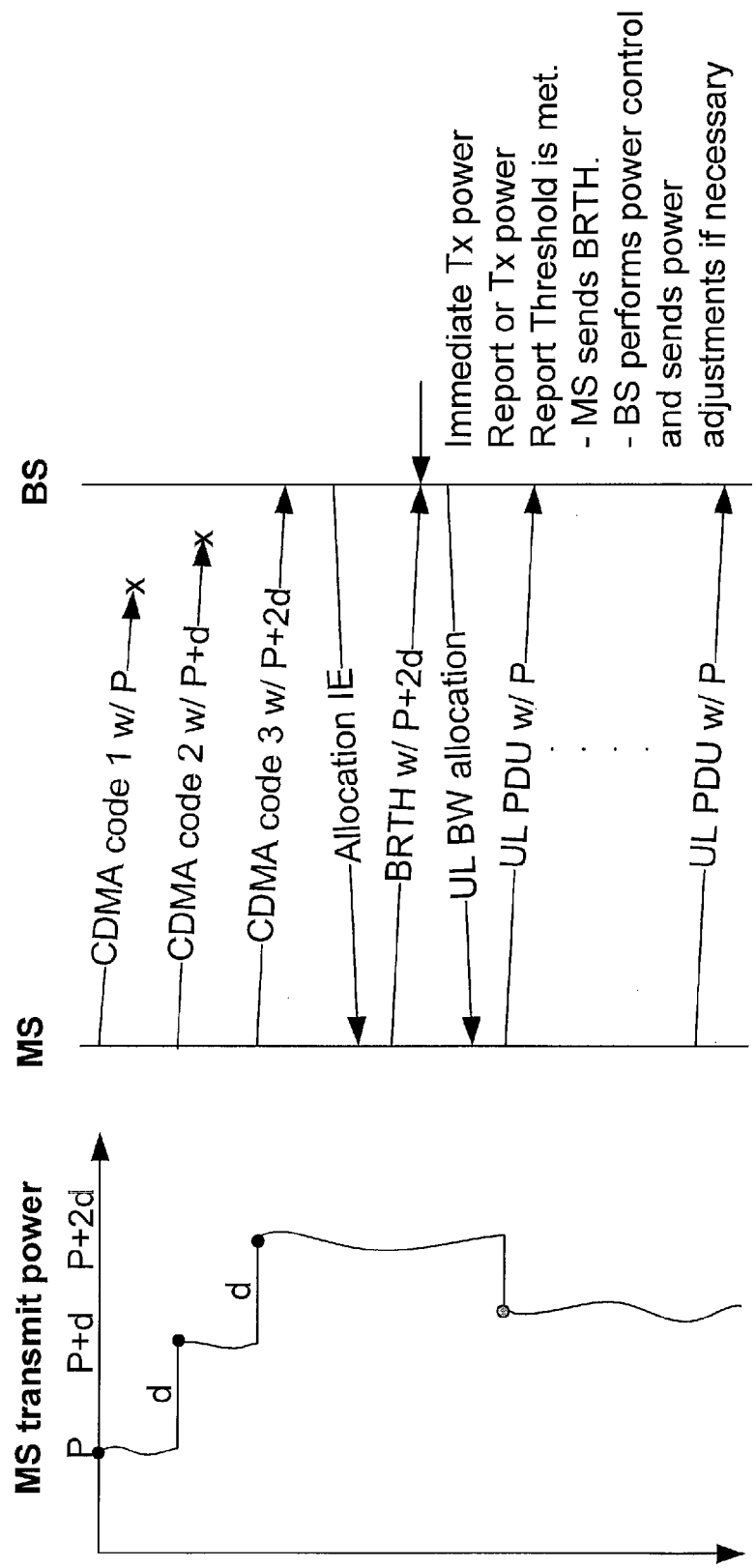
Figure 5A:
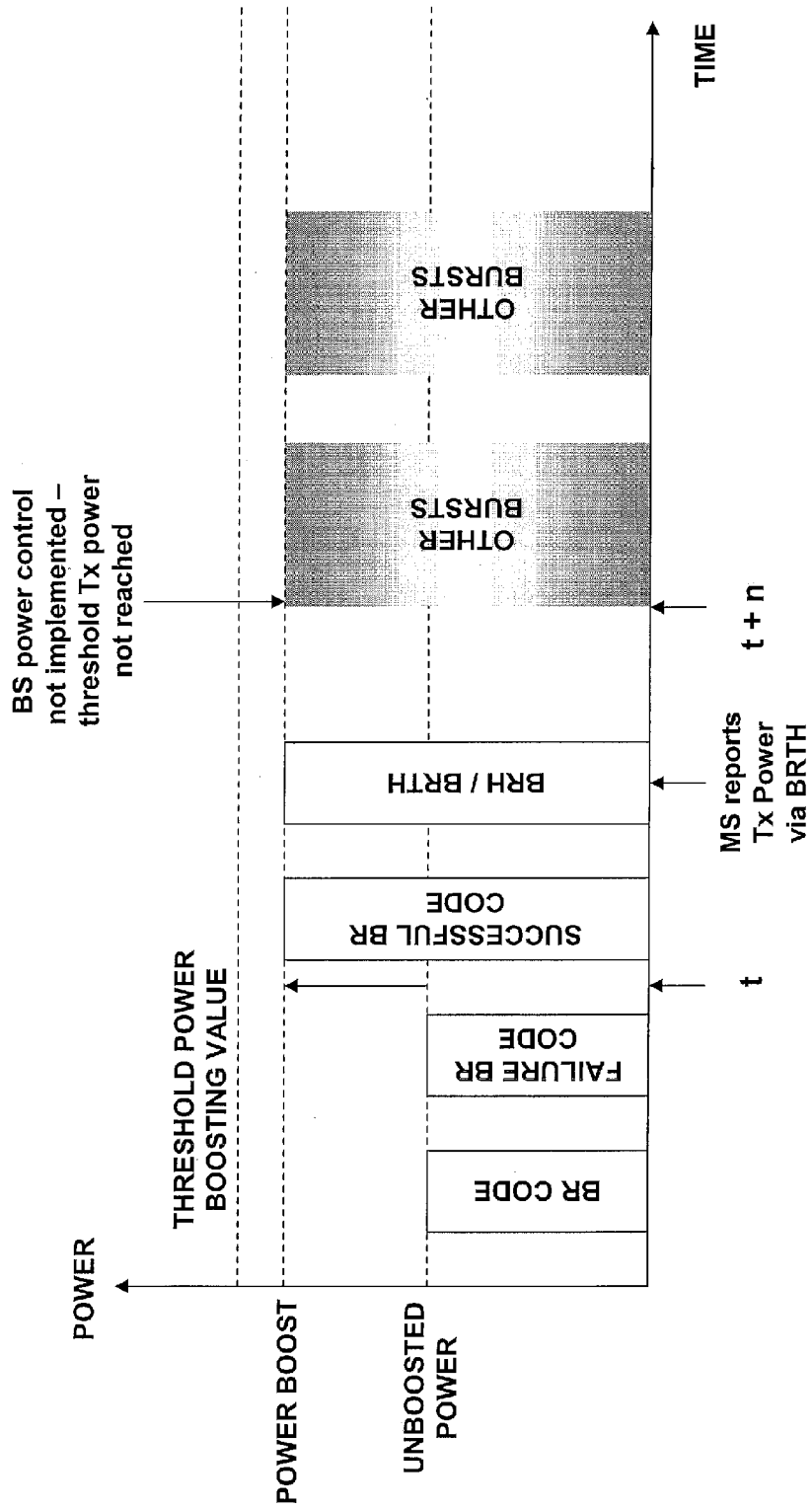
Figure 5B:
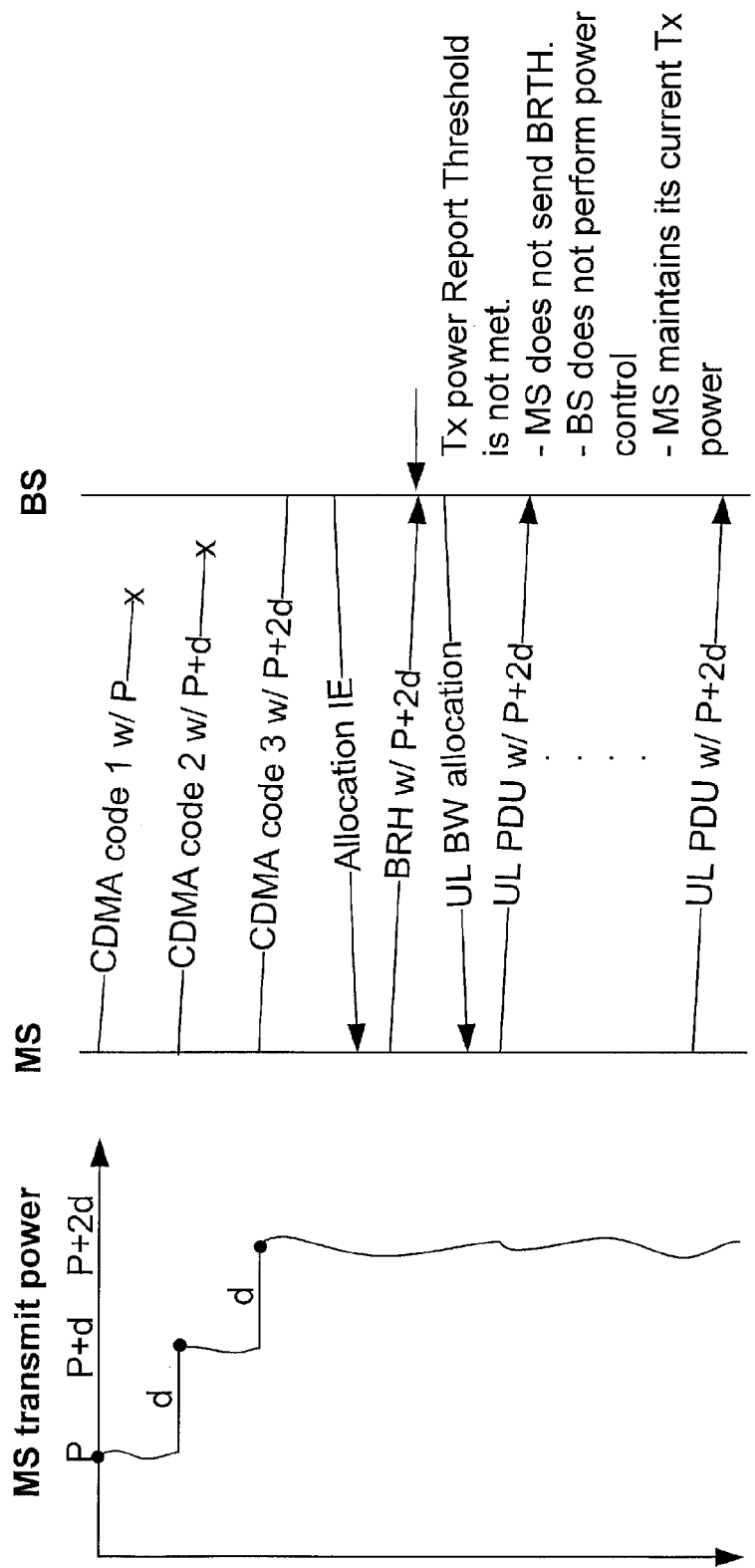
Figure 6:
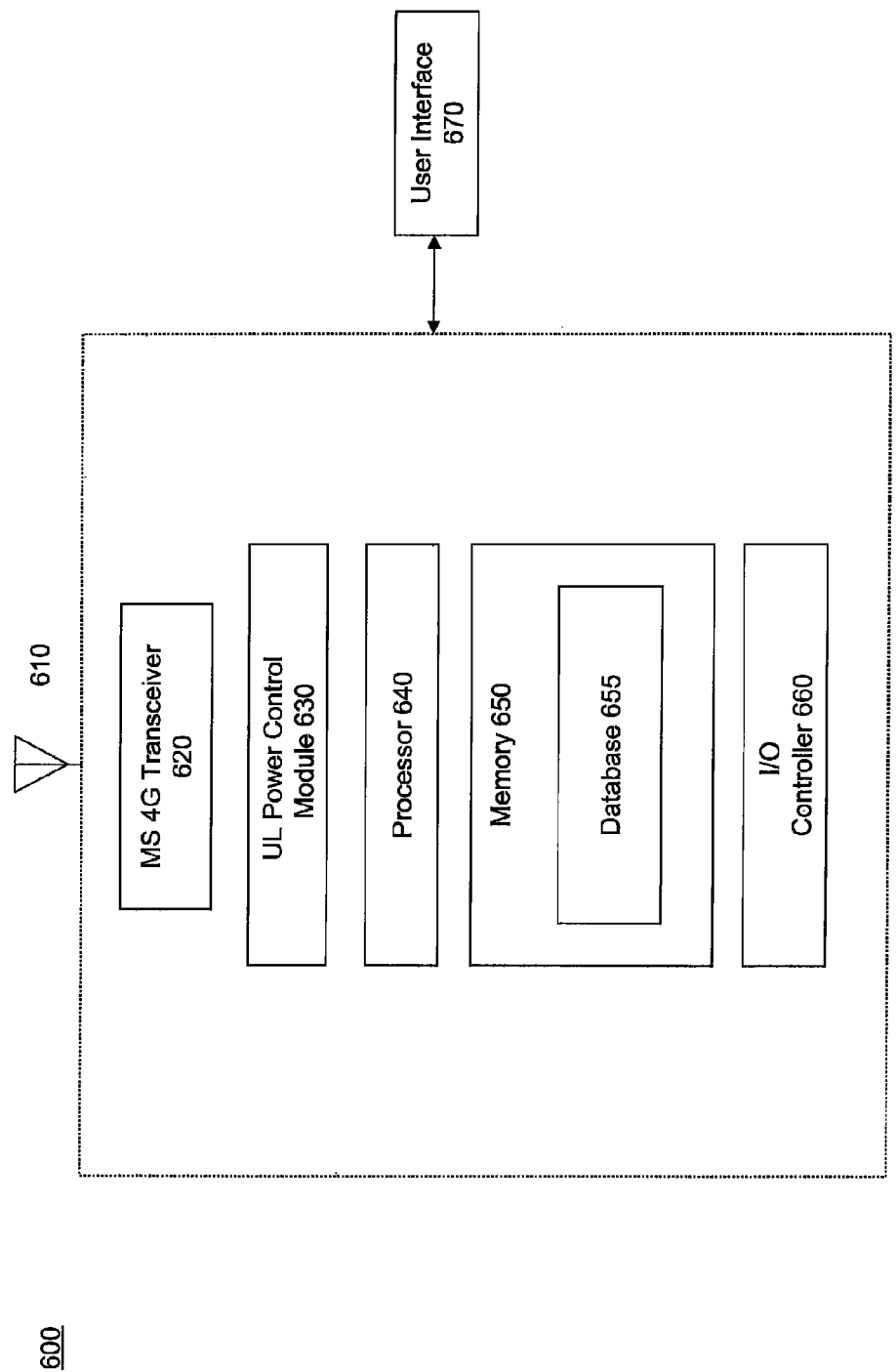
Figure 7:
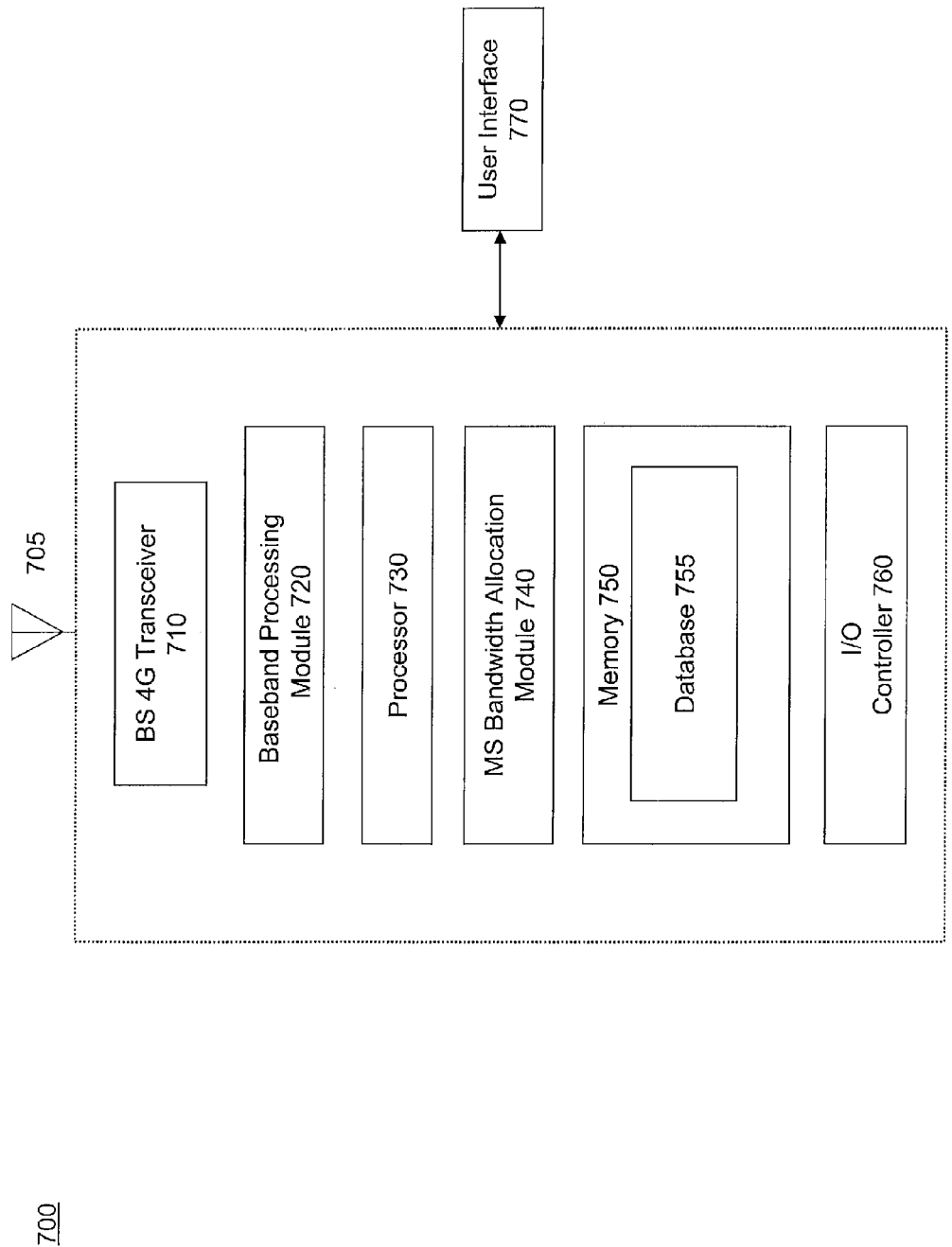
Figure 8:
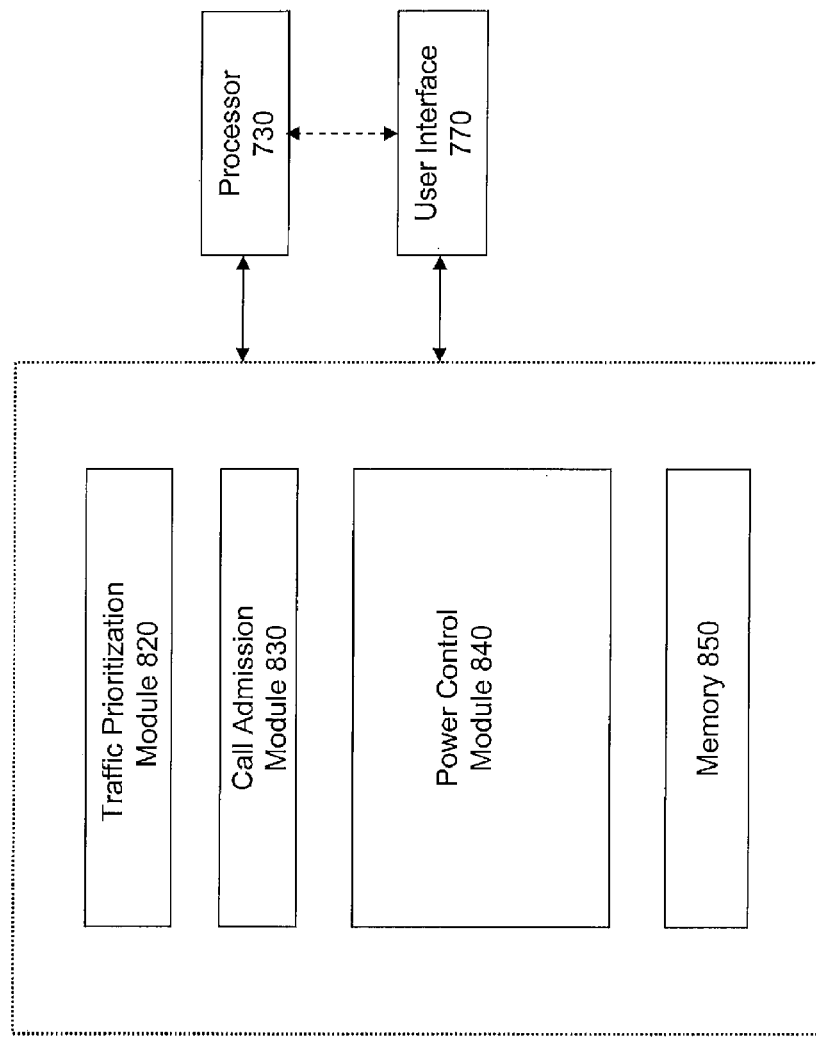

FIG. 3B illustrates a conventional call or message flow procedure between MS and BS related to the power shortage scenario of FIG. 3A, as per a previously submitted proposed WiMAX standard change that attempts to overcome one problem found under the existing WiMAX standard and in which a power increase is applied only until the first UL allocation, and after which packet losses may occur before the next UL power adjustment;

FIG. 4A illustrates a packet collision scenario in which MS UL power is controlled by selective BS power control implemented as necessary to reduce UL power according to an embodiment;

FIG. 4B illustrates a call or message flow procedure between MS and BS for the packet collision scenario of FIG. 4A in which, after power boosting, the MS selectively reports its transmit power, and the BS selectively performs power control;

FIG. 5A illustrates a power shortage scenario in which MS UL power is increased according to an embodiment, but is not controlled by BS power control because the increase in MS UL power is less than a predetermined threshold;

FIG. 5B illustrates a procedure according to an embodiment of this disclosure for the power shortage scenario of FIG. 5A in which power boosting is applied without power control from the BS;

FIG. 6 illustrates an exemplary block diagram of a mobile station (MS) in which the uplink power control method of this disclosure may be implemented;

FIG. 7 provides an exemplary block diagram of a RAN BS in accordance with an embodiment of this disclosure; and FIG. 8 provides an exemplary block diagram of a MS Bandwidth Allocation module according to an embodiment of this disclosure.

DETAILED DESCRIPTION

In the discussion of various embodiments and aspects of the system, base station, and method of this disclosure, examples of a processor may include any one or more of, for instance, a personal computer, portable computer, personal digital assistant (PDA), workstation, web-enabled mobile phone, WAP device, web-to-voice device, or other device. Further, examples of mobile devices may include wireless phone handsets, smart phones, modems, laptop computers with embedded dual-mode functionality, and mobile Internet devices such as used for video streaming, for example, including dual-mode 3G CDMA/4G mobile devices, including WiMAX and LTE 4G devices.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

In one or more embodiments, the MS sends UL transmission power report in the UL allocation provided by CDMA Allocation IE, for example by the "Bandwidth request and UL Tx power report header" (BRTH). Two options may be conditioned on various scenarios.

Option (1): the MS increased transmit power during the BR ranging procedure due to failure CDMA codes; and Option (2): the MS increased transmit power during the BR ranging procedure due to failure CDMA codes, and the total increase is equal to or greater than the "Tx_Power_Report-_Threshold" as defined in the uplink channel descriptor (UCD).

For option (2) above, the current WiMAX standard allows the MS to send a power report in such a case, i.e., when the change of transmit power is above a threshold To ensure appropriate UL transmission power and prevent from packet losses and unnecessarily high UL signal levels, the report at the immediate UL allocation is desirable for the BS to perform appropriate power control as discussed below.

One difference between options (1) and (2) is that option (2) has a power threshold, while option (1) does not. Specifically, option (1) requires a power report whenever there is a power boost due to failure CDMA codes, while option (2) requires a power report only when the total increase in power is equal to or greater than the threshold. One advantage of option (1), therefore, is more timely power control, as specified below. One advantage of option (2) is that it is more implementation friendly because the current WiMAX implementation already has the power threshold-based-report available. Under typical WiMAX implementations, both the threshold and the step for power boosting are 3 dB, i.e., the condition for sending a Tx report, under either Option (1) or (2), will be always satisfied whenever there is power boosting during the CDMA ranging procedure.

In either Option (1) or (2), the BS selectively performs power control using the MS UL power as an input to a BS power control algorithm which is used to determine MS UL power control adjustments provided to the MS, as deemed necessary. Specifically, where transmission power is insufficient, and where maintaining the power increases during the ranging procedure is necessary for future UL allocations, the immediate power control correction from the BS ensures that the increase is applied. Hence this power control avoids packets losses between the UL allocation and the next power control adjustment, which is the issue of one conventional solution.

In contrast to the current WiMAX standard approach, upon receiving a transmission power report from the MS after successful BR CDMA ranging, the BS correction may be provided by performing MS UL power control and sending power adjustments, if deemed necessary, based upon the MS UL power reported in the BRTH message, i.e., by using MS UL power as an input to the power control decision made by the BS, thus providing a "closed loop" control mechanism for the MS UL power.

FIGS. 4A and 4B illustrate a packet collision scenario in which MS UL power is controlled by selective BS power control implemented as necessary to control, e.g., to reduce, UL power. Between times t and (t+n), the MS may report MS UL (transmit or "Tx") power via the BRTH message. Depending on implementation, the MS may be configured to report any power boosting required to successfully complete the CDMA ranging and subsequent UL BW allocation processes with the BS, as in Option (1) above and FIGS. 4A and 4B. Alternatively, or selectively, the MS may be configured to report power boosting only above a predetermined threshold, as in Option (2) above, and as described with respect to FIGS. 5A and 5B, discussed below.

In connection with option (1), FIG. 4B illustrates a call or message flow procedure between MS and BS for the packet collision scenario of FIG. 4A in which, after power boosting, the MS immediately reports MS UL transmit power via the BRTH. By following this procedure, the BS is able to decide whether a condition necessary or desirable to perform MS UL power control is met in order to avoid the loss of data packets from the MS. That is, after receiving a successful BR ranging code, a UL allocation is provided by CDMA Allocation IE to the MS, and then a UL transmission power report is received from the MS identified in the CDMA Allocation IE, which is used by the BS to perform MS UL power control to adjust MS transmit power at an appropriate level, The immediate power control from the BS in Option (1) ensures that the MS operates at an appropriate power level for future UL transmissions, no matter if there is a power increase during the ranging procedure or not. Hence, this approach handles both cases, i.e., packet collisions and insufficient transmission power. Thus, this novel approach improves upon and avoids the issues in both the current standard and previously proposed solutions to the current problem in the standard.

In the other case where maintaining the power increases would cause issues, the immediate power control correction from the BS ensures that the increase is removed. Hence, the inventive power control scheme avoids unnecessarily high UL signal levels and interference, and also saves device battery life, which solves the issues in the current WiMAX standard.

FIG. 5A illustrates a power shortage scenario in which MS UL power is not controlled by BS power control because the power boost value is less than a "triggering" threshold power boosting value. FIG. 5B illustrates a procedure corresponding to FIG. 5A in which power boosting is applied by the MS, without power control from the BS due to the Tx Power Report Threshold not being met, resulting in no BRTH message being sent by the MS, no BS power control, and the MS UL power being maintained for subsequent bursts or UL PDUs. It should be noted that, since the Tx Power Report Threshold is not met, the power increase is not significant to cause performance or QoS issues, such as excessive UL signal levels, interference between mobile users, and reduced MS battery life.

Under the novel approach outlined in Options (1) and (2) above, the MS is made to operate at an appropriate power level, in contrast to the existing WiMAX standard. In the case of power shortage, the implementations above maintain the power increase for future UL PDUs, and hence avoids packet losses. In the case of collision, this disclosure removes the power increase and hence avoids unnecessarily high UL signal levels, increased interference, and saves battery life.

In FIG. 6, MS 600 is illustrated and which includes antenna 610 operatively coupled to MS 4G transceiver 620, e.g., a WiMAX transceiver. MS 600 may also include UL power control module 630, which may be implemented by one or more processors to carry out MS UL power boosting according to an embodiment of this disclosure, discussed above with respect to Options (1) and (2). Processor 640 is coupled to memory 650 which contains database 655, all of which may be included in MS 600 to carry out other MS-related functions as is known in the art. I/O controller 660 may be configured to control the overall functionality of MS 600, in conjunction with user interface 670 whereby a user may initiate various operations.

FIG. 7 provides an exemplary block diagram of a WiMAX or LTE RAN BS 700 in accordance with an embodiment. BS 700 includes antenna 705, BS 4G transceiver 710, baseband processing module 720, one or more processors 730, MS Bandwidth Allocation Module 740, memory 750 containing database 755 therein, and input/output controller 760. User interface 770 is operatively coupled to processor 730. MS Bandwidth Allocation Module 740 is configured to generate commands to carry out BS power control of MS UL power in accordance with embodiments discussed above based, at least in part, upon the MS UL power reported in a transmit power message from the MS, e.g., a BRTH message in a WiMAX implementation.

FIG. 8 provides an exemplary block diagram of MS Bandwidth Allocation Module 740 that may be implemented in either hardware or software, or a combination of hardware and software represented by a processor, memory, and functional blocks implemented by software in one or more processors. Traffic prioritization module 820 is configured to prioritize the various service flows within the RAN, including multiple different SFs or bearers assigned to an MS. Call admission module 830 is configured to accept and initialize user traffic including both BE traffic and non-BE traffic in a WiMAX implementation, or to initialize GBR and non-GBR bearers in an LTE implementation. Power control module 840 may be configured to selectively assign MS UL power for multiple MSs to maintain the necessary service flows and establish minimum rate settings for each service class user.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method for providing uplink (UL) power control for a wireless mobile station (MS), the method comprising:
   after transmission of an unanswered bandwidth request by the MS, incrementally boosting an UL transmit power of one or more subsequent bandwidth requests by the MS to a boosted UL power level at which UL bandwidth is allocated to the MS by a base station (BS);
   selectively reporting the boosted UL power level in a bandwidth request message to the BS after the UL transmit power has been boosted; and
   selectively controlling the boosted UL power level at the MS responsive to an MS UL power control command that determines an UL power correction, wherein the command is determined based on the boosted UL power level reported to the BS.

2. The method of claim 1, wherein said selectively reporting the boosted UL power level to the BS comprises reporting a current MS power level to the BS responsive to any boost in MS transmit power.

3. The method of claim 1, wherein said selectively reporting the boosted power level to the BS comprises reporting a current MS power level to the BS responsive to the MS transmit power exceeding a transmit power reporting threshold.

4. The method of claim 3, wherein the transmit power reporting threshold is selected to ensure that the boosted power level is not significant enough to cause undesired effects on a UL signal level, unit-to-unit interference, and/or a battery life for the MS.

5. The method of claim 1, further comprising the BS selectively controlling the UL transmit power level by reducing the boosted UL power level.

6. The method of claim 5, wherein the BS sends power adjustment commands to the MS in response to any boosted power level.

7. The method of claim 5, wherein the BS sends power adjustment commands to the MS in response to the boosted power level being greater than a transmit power reporting threshold.

8. The method of claim 1, wherein the wireless MS comprises a WiMAX MS.

9. The method of claim 8, wherein said selectively reported boosted power level is reported in a BRTH message.

10. The method of claim 1, wherein the wireless MS comprises LTE user equipment (UE).

11. A system for providing mobile station (MS) uplink (UL) power control for a wireless MS, the system comprising:
    a MS comprising at least one computer processor device and a transceiver,
    wherein the at least one computer processor device is configured to:
    after transmission of an unanswered bandwidth request by the MS, incrementally boost an UL transmit power of one or more subsequent bandwidth requests by the MS to a boosted power level at which UL bandwidth is allocated to the MS by a base station (BS);
    selectively report the boosted UL power level in a bandwidth request message to the BS after the UL transmit power has been boosted;
    receive an MS UL power control command from the BS that determines an UL power correction in response to the report of the boosted UL power level to the BS; and
    in response to the MS UL power control command, apply the UL power correction to the MS UL.

12. The system of claim 11, wherein said selective report of the boosted UL power level to the BS comprises a report of a current MS power level to the BS responsive to any boost in MS transmit power.

13. The system of claim 11, wherein said selective report of the boosted UL power level to the BS comprises a report of a current MS power level to the BS responsive to the MS boosted transmit power exceeding a transmit power reporting threshold.

14. The system of claim 13, wherein the transmit power reporting threshold is selected to ensure that the boosted UL power level is not significant enough to cause undesired effects on a UL signal level, unit-to-unit interference, and/or a battery life for the MS.

15. The system of claim 11, wherein the wireless MS comprises a WiMAX MS.

16. The system of claim 15, wherein said selective report of the boosted power level is reported in a BRTH message.

17. The system of claim 11, wherein the wireless MS comprises LTE user equipment (UE).

18. A base station (BS) capable of communication in a radio access network (RAN) with a mobile station (MS), the BS comprising:
    a transceiver; and
    a computer processor device operatively coupled to the transceiver, and configured to implement a MS bandwidth allocation module,
    wherein the MS bandwidth allocation module is configured to process a received bandwidth request message comprising a MS uplink (UL) transmit power report, the report comprising a boosted UL power level after the UL transmit power has been boosted at the MS, and, in response thereto, to generate one or more MS UL power control commands.

19. The BS of claim 18, wherein the BS comprises a WiMAX BS, and the received MS UL transmit power report comprises a BR TH message.

20. The BS of claim 18, wherein the MS bandwidth allocation module generates MS UL power adjustment commands for transmission to the MS in response to any boosted power level.

21. The BS of claim 18, wherein the MS bandwidth allocation module generates MS UL power adjustment commands for transmission to the MS in response to the boosted power level exceeding an MS UL transmit power reporting threshold.

* * * * *